US012338097B2

(12) United States Patent
Manning

(10) Patent No.: US 12,338,097 B2
(45) Date of Patent: Jun. 24, 2025

(54) CONFIGURABLE CABLE DOLLY AND TELECOMMUNICATIONS EQUIPMENT PULLEYS AND METHODS FOR USING SAME

(71) Applicant: Charter Communications Operating, LLC, St. Louis, MO (US)

(72) Inventor: Jonathan Joseph Finbarr Manning, Durham, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 493 days.

(21) Appl. No.: 17/835,070

(22) Filed: Jun. 8, 2022

(65) Prior Publication Data

US 2023/0399194 A1 Dec. 14, 2023

(51) Int. Cl.
*B65H 49/32* (2006.01)
*B62B 1/12* (2006.01)

(52) U.S. Cl.
CPC ............. *B65H 49/321* (2013.01); *B62B 1/12* (2013.01); *B62B 2202/025* (2013.01); *B65H 2701/34* (2013.01)

(58) Field of Classification Search
CPC .................................................. B65H 75/403
See application file for complete search history.

(56) References Cited

U.S. PATENT DOCUMENTS

| | | | | |
|---|---|---|---|---|
| 4,391,422 A * | 7/1983 | McDonald | ............. | B62B 1/264 |
| | | | | 242/129.6 |
| 4,564,152 A * | 1/1986 | Herriage | ................ | B65H 49/32 |
| | | | | 242/594.6 |
| 4,901,937 A * | 2/1990 | Mendoza | ............... | B65H 49/32 |
| | | | | 242/129.62 |
| 5,285,981 A * | 2/1994 | Pavelka | ................. | B65H 49/32 |
| | | | | 242/129 |
| 5,577,745 A * | 11/1996 | Birk | ........................ | B62B 1/262 |
| | | | | 280/47.28 |
| 5,622,319 A * | 4/1997 | Babb | .................. | B65H 75/4463 |
| | | | | 137/355.27 |
| 6,086,013 A * | 7/2000 | Looney, Jr. | .......... | B65H 49/321 |
| | | | | 242/598.5 |
| 6,182,920 B1 * | 2/2001 | Watkins | ................. | B62B 3/022 |
| | | | | 242/594.6 |

(Continued)

OTHER PUBLICATIONS

Carolina: "Double Tandem Pulley", Site Visited [Jun. 3, 2022], pp. 1-2, Retrieved from Internet URL: https://www.carolina.com/catalog/detail.jsp?prodId=752026&utm_source=google&utm_medium=cpc&scid=scplp752026&sc_intid=752026&gclid=Cj0KCQjwl_SHBhCQARIsAFIFRVU6nn078p4hWG1CMr-3XwhmVvv5-xbWnHUS5xT5YRFUETAJGeycqscaAnMeEALw_wcB.

(Continued)

*Primary Examiner* — William A. Rivera
(74) *Attorney, Agent, or Firm* — Young Basile Hanlon & MacFarlane, P.C.

(57) ABSTRACT

Disclosed herein are a configurable cable dolly and pulleys and methods for using same. A cable dolly includes a frame including a pair of reel spool arm placement holes, a handle attached to a top part of the frame, a reel spool arm removeably positioned in the pair of reel spool arm placement holes, a pair of reel spool arm clamps attached to the frame, the pair of reel spool arm clamps configured to clamp the reel spool arm to the frame, a pair of wheels attached to the frame, and a base attached to the frame.

18 Claims, 11 Drawing Sheets

(56) References Cited

U.S. PATENT DOCUMENTS

| | | | | |
|---|---|---|---|---|
| 6,276,503 | B1* | 8/2001 | Laughlin, Jr. | H02G 11/02 191/12.2 A |
| 6,698,682 | B1* | 3/2004 | Roderick | B65H 49/321 242/594.4 |
| 7,784,729 | B1* | 8/2010 | Hope | B65H 49/32 242/597.4 |
| 10,124,982 | B1* | 11/2018 | Rhoads | B65H 49/08 |
| 2004/0119256 | A1* | 6/2004 | Anderson | B62B 1/26 280/47.28 |
| 2009/0224498 | A1* | 9/2009 | Diedericks | B62B 3/10 280/79.6 |
| 2024/0190494 | A1* | 6/2024 | Benjauthrit | B62B 1/12 |

OTHER PUBLICATIONS

Toolup: "Greenlee 916 Cable Reel Transporter", Site Visited [Jun. 3, 2022], pp. 1-5, Retrieved from Internet URL: https://www.toolup.com/Greenlee-916-Cable-Reel-Transporter?gclid= EAIaIQobChMI8Onj9P2N9AIVBWxvBB0YHwUcEAkYCSABEgKofvD_BwE.

Amazon: "Vestil Wire-D-E Steel Economy Wheel Wire Reel Caddy, 17-¾" Width, 43-¼" Height, 19-½" Depth, 150 lbs Capacity", Site Visited [Jun. 3, 2022], pp. 1-7, Retrieved from Internet URL: https://www.amazon.com/Vestil-WIRE-D-Economy-Height-Capacity/dp/B0052PXKAK/ref=pd_sbs_1/139-1973193-3572706?pd_rd_w-g5ICC&pf_rd_p=690958f6-2825-419e-9c16-73ffd4055b65&pf_rd_r=A27432A1ZQ2HY00XKHX3&pd_rd_r=2bda8a5d-4b43-4782-80c0-9183d93a5449&pd_rd_wg=RkYqs&pd_rd_i=B0052PXKAK&th=1.

Grainger: "Gardner Bender, Wire Spool Cart and Caddy: 300 lb Load Capacity, 4 Spindles", Site Visited [Jun. 3, 2022], pp. 1-2, Retrieved from Internet URL: https://www.grainger.com/product/15V949?ef_id= EAIaIQobChMI8Onj9P2N9AIVBWxvBB0YHwUcEAkYBiABEgKPWvD_BWE:G:s&s_kwcid=AL!2966!3!496359972658!!!g!438323478123!&gucid=N:N:PS:Paid:GGL:CSM-2295:4P7A1P:20501231&gclid=EAIaIQobChMI8Onj9P2N9AIVBWxvBB0YHwUcEAkYBiABEgKPWvD_BwE&gol.

* cited by examiner

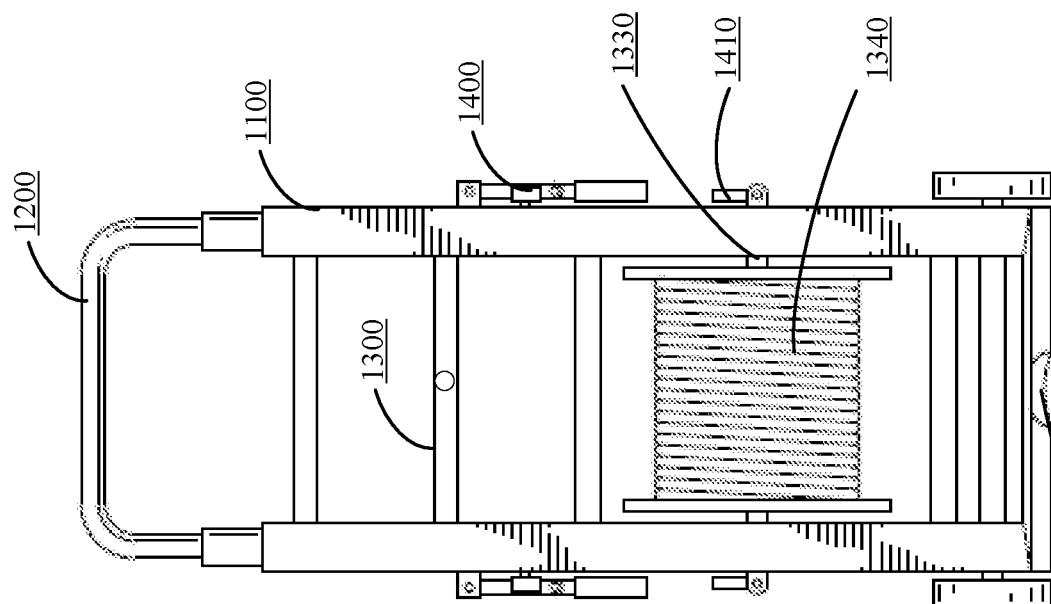
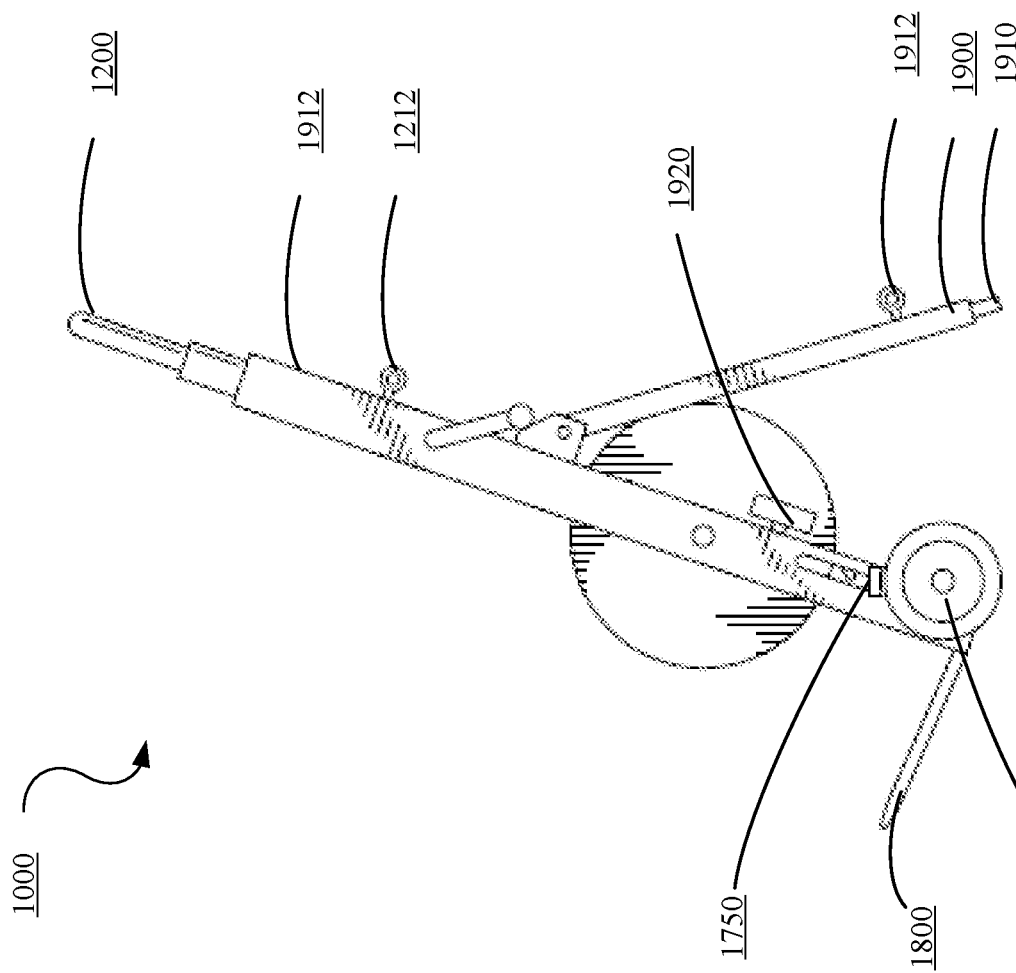

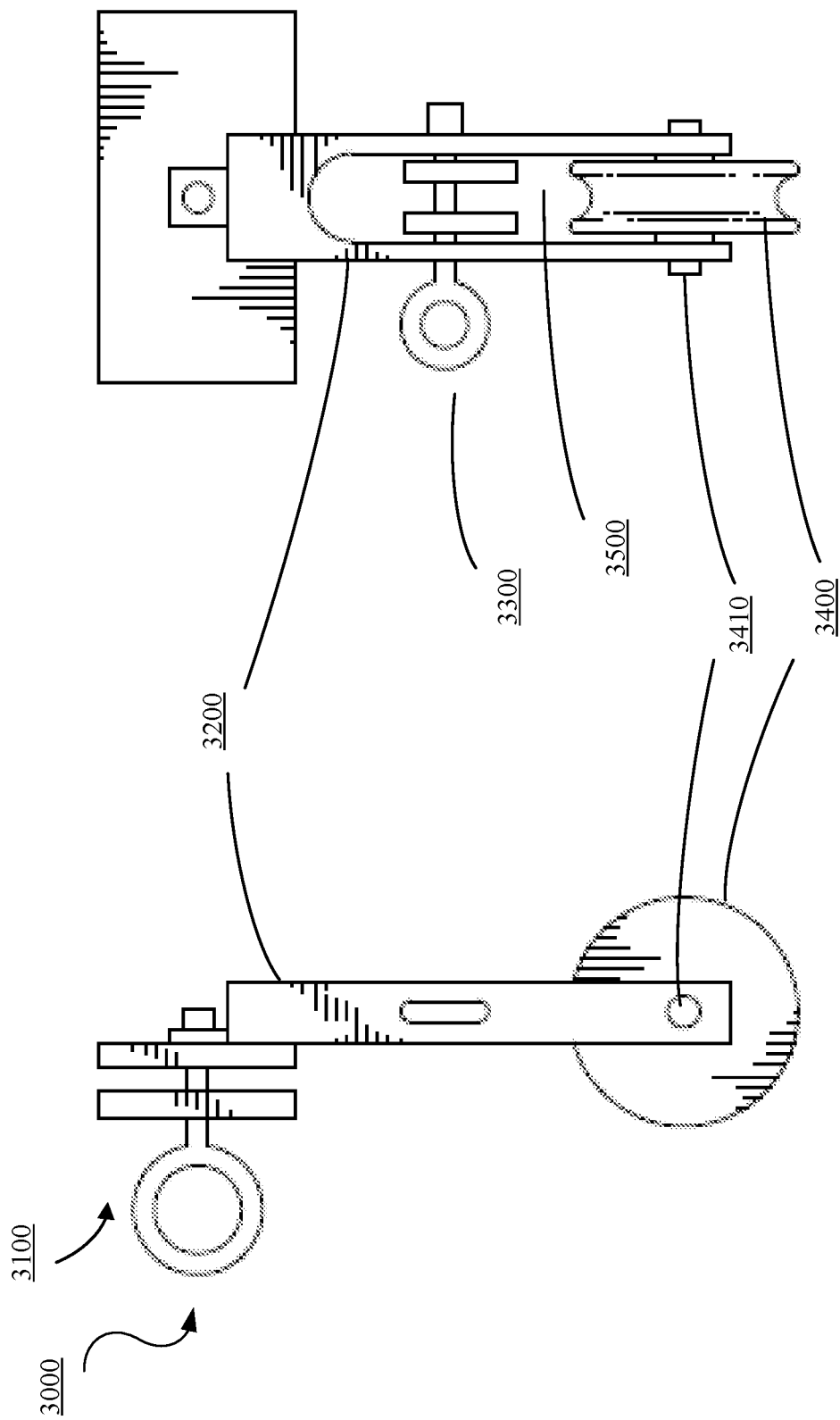

CONFIGURABLE CABLE DOLLY AND TELECOMMUNICATIONS EQUIPMENT PULLEYS AND METHODS FOR USING SAME

TECHNICAL FIELD

This disclosure relates to telecommunications equipment.

BACKGROUND

Telecommunications service providers provide services to users, subscribers, or customers (collectively "users") at their premises via a cable system in addition to other telecommunications infrastructure. The cable system can be a coaxial cable system, a fiber optics cable system, a hybrid fiber-coaxial (HFC) cable system, and/or combinations thereof (collectively "data cable"). The cable systems are laid underground, using telephone or other utility poles or structures, and/or combinations thereof. Laying of cable can involve carrying or transportation of heavy cable rolls, e.g., weighing 200 lbs. and pulling, throwing, or dropping the cable underground or via aerial spans, respectively, which can run over 100 to 200 feet in distance. Moreover, hazards have to be accounted for, such as cars, people, bicycles, and/or other stationary and non-stationary objects.

SUMMARY

Disclosed herein are telecommunications equipment and methods for using the telecommunications equipment to lay cable.

In implementations, a cable dolly includes a frame including a pair of reel spool arm placement holes, a handle attached to a top part of the frame, a reel spool arm removeably positioned in the pair of reel spool arm placement holes, a pair of reel spool arm clamps attached to the frame, the pair of reel spool arm clamps configured to clamp the reel spool arm to the frame, a pair of wheels attached to the frame, and a base attached to the frame.

In implementations, a telecommunications apparatus includes a cable dolly, a plurality of pulleys, and a traveler pulley. The cable dolly includes a first removeable reel spool arm configured to hold a guy wire spool and a rope spool and a second removeable reel spool arm configured to hold a data cable spool. The traveler pulley is configured be attached to a rope from the rope spool and a data cable from the data cable spool. The one or more of the plurality of pulleys are attached to at least one of a span wire spanning two poles, a pole, or a premises. A guy wire from the guy wire spool is connected to the attached pulleys. The traveler pulley is deployed on the guy wire and configured to be moved by the rope across the guy wire. The data cable is laid out from the second removeable reel spool arm to the premises by moving the traveler pulley.

BRIEF DESCRIPTION OF THE DRAWINGS

The disclosure is best understood from the following detailed description when read in conjunction with the accompanying drawings and are incorporated into and thus constitute a part of this specification. It is emphasized that, according to common practice, the various features of the drawings are not to-scale. On the contrary, the dimensions of the various features are arbitrarily expanded or reduced for clarity.

FIG. 1B is a side view of the cable dolly of FIG. 1A in a standing configuration in accordance with implementations.

FIG. 1C is another view of the cable dolly of FIG. 1A in accordance with implementations.

FIG. 3A is an example pulley in accordance with implementations.

FIG. 3B is a side view of the example pulley of FIG. 3A in accordance with implementations.

DETAILED DESCRIPTION

Figure 1A:
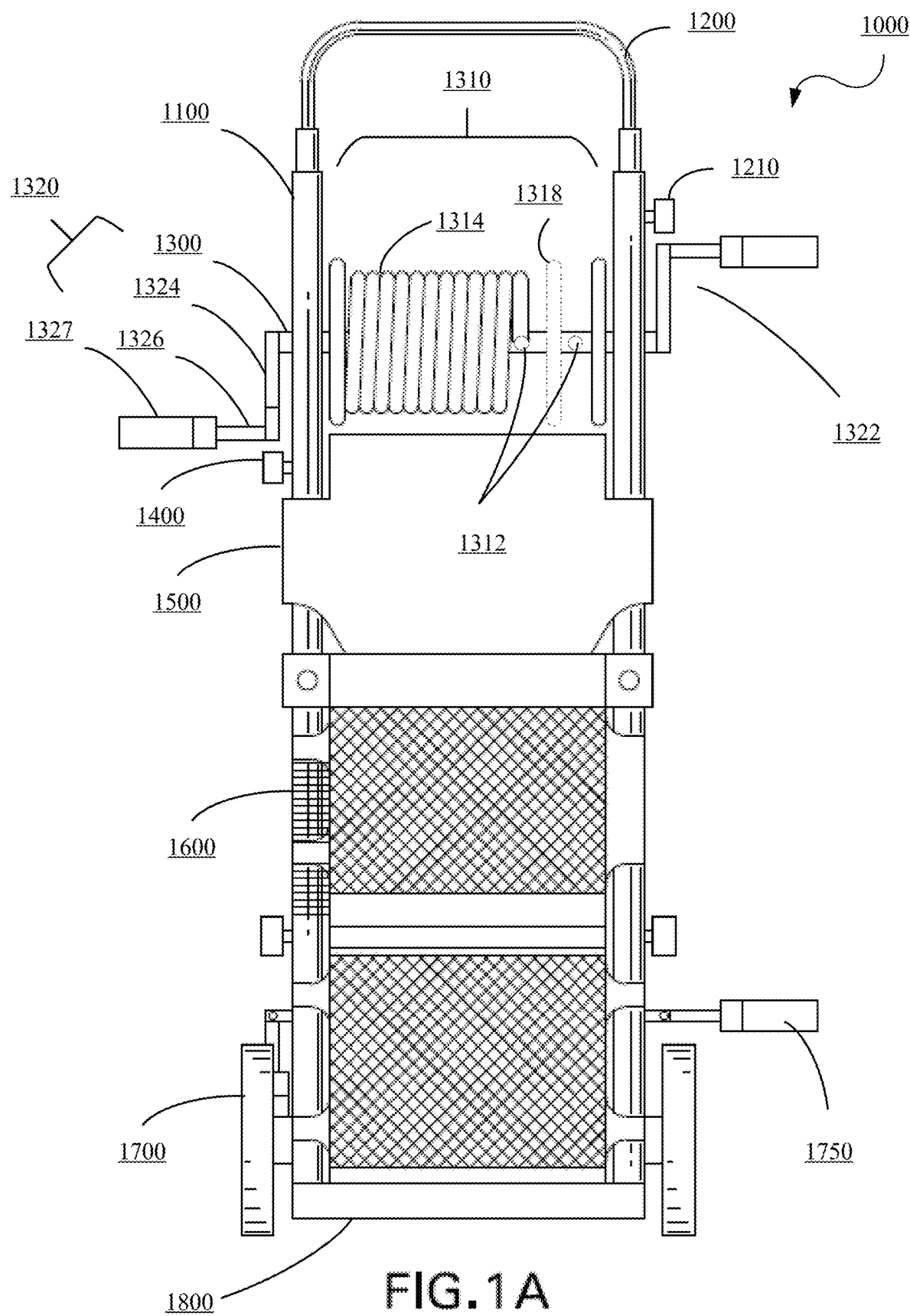
FIG. 1A is a view of an example cable dolly in accordance with implementations.

The figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Embodiments are provided throughout so that this disclosure is sufficiently thorough and fully conveys the scope of the disclosed embodiments to those who are skilled in the art. Numerous specific details are set forth, such as examples of specific aspects, devices, and methods, to provide a thorough understanding of embodiments of the present disclosure. Nevertheless, it will be apparent to those skilled in the art that certain specific disclosed details need not be employed, and that embodiments may be embodied in different forms. As such, the exemplary embodiments set forth should not be construed to limit the scope of the disclosure.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof.

The steps, processes, and operations described herein are thus not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

Yet further, although the terms first, second, third, etc. may be used herein to describe various elements, steps or aspects, these elements, steps or aspects should not be limited by these terms. These terms may be only used to distinguish one element or aspect from another. Thus, terms such as "first," "second," and other numerical terms when used herein do not imply a sequence or order unless clearly indicated by the context. Thus, a first element, step, component, region, layer or section discussed below could be termed a second element, step, component, region, layer or section without departing from the teachings of the disclosure.

The non-limiting embodiments described herein are with respect to cable dollies and pulleys and methods for using thereof. The cable dollies and pulleys and methods for using thereof may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the fusion packages and the methods for making the fusion packages.

Disclosed herein are implementations of cable dollies and pulleys and methods for using thereof. The implementations shown are illustrative and other implementations are within the scope of the specification and claims described herein. For purposes of illustration, certain aspects, features, and the like are described with respect to implementations. These aspects, features, and the like are appropriately applicable to and interchangeable with other implementations described herein.

In some implementations, the cable dollies and pulleys and methods for using thereof increase and improve production by targeting fatigue from strenuous cable routing. The system includes multiple telecommunications equipment which collectively enable a reduction in strain on a service provider personnel back, lower limbs and upper body by simplifying a complex cable installation or replacement drop routing process to a singular modular form. The system assists service provider personnel by preventing onset of fatigue by eliminating a large amount of physical work involved in the service of cable drops (service lines) by spreading weight loads over the telecommunications equipment. This helps service provider personnel have more energy and be less prone to injury.

In some implementations, the telecommunications equipment includes a cable dolly which has a built-in stand or cable deployment configuration that helps the service provider personnel transport and set up for aerial drop routing through a pulley system. In some implementations, the cable dolly includes a built-in device for easily drawing out underground cable over a long span efficiently and more readily. In some implementations, the cable dolly includes a cable catchment tool to enable the service provider personnel to quickly tidy long lengths of cable to be disposed of in an efficient and convenient manner.

In some implementations, the telecommunications equipment includes a system of pulleys that enable the service provider personnel to route the heavily resistant surface of a drop cable aerially instead of having to first roll out the cable to ensure no kinks occur when drawing longer drops.

In some implementations, the telecommunications equipment includes a tray for the transportation of equipment boxes and tools over distance to lower fatigue.

In some implementations, the telecommunications equipment includes a guy wire system for transporting aerial cable across busy or wide roads with no impedance to normal traffic, ensuring drop height is met more efficiently and matching power cable aerial routes and state guidelines.

In some implementations, the telecommunications equipment includes a traveler pulley and rope to replace aerial cable damaged by debris or water-logged in contrast to using an attach to old cable and pull through method.

The described implementations provide an apparatus and method for service cable installation and delivery, including all variations implied by its use or design. A cable dolly and accessories are provided for the methodical, systematic, design, and implementation of service cable in the telecommunications industry. An all-encompassing, ergonomically safe system for the routing, handling, and delivery of telecommunications service cable by service provider professionals. A free-standing, configurable cable caddy and/or dolly with cable spooling apparatus with industry and service specific adaptations for modular implementation in cable distribution networks and the like.

FIG. 1A is a view of an example cable dolly 1000 in accordance with implementations. The cable dolly 1000 includes a frame 1100, an adjustable handle 1200, a removeable reel spool or catchment arm (collectively "removeable reel spool arm") 1300, a pair of reel spool arm clamps 1400, a removeable tray 1500, a spool meter 1600, a set of wheels 1700, a set of wheel brakes 1750, and a base 1800. The adjustable handle 1200, the removeable reel spool arm or catchment arm 1300, the pair of reel spool arm clamps 1400, the removeable tray 1500, the spool meter 1600, the set of wheels 1700, the set of wheel brakes 1750, and the base 1800 are connected to or attached to (collectively "connected to") to the frame 1100. The frame 1100, the adjustable handle 1200, the removeable reel spool arm 1300, the pair of reel spool arm clamps 1400, the set of wheel brakes 1750, and the base 1800 can be made of aluminum, steel, and/or other suitable materials. The removeable tray 1500 can be made of metal, plastic, rubber, and/or other suitable materials.

The adjustable handle 1200 enables the cable dolly 1000 to be adjusted to a service provider personnel. The adjustable handle 1200 cane be adjusted by pulling on one or more handle clips 1210 and adjusting the adjustable handle 1200 accordingly. The one or more handle clips 1210 can be positioned or placed in adjustment holes present in the adjustable handle 1200.

The removeable reel spool arm 1300 includes a catchment section 1310 and a pair of collapsible arms 1320,1322 on each end of the catchment section 1310. The catchment section 1310 includes one or more catchment mechanisms 1312 for attachment of a cable, data cable, rope 1314, guy wire, steel wire, and the like (collectively "cable" unless otherwise specified). In the instance there are two or more catchment mechanisms, a separator 1318 can be attached to the removeable reel spool arm 1300. The one or more catchment mechanisms 1312 can be used to roll up the cable, carry cable, or pull cable from the cable dolly 1000, as applicable and appropriate. In an example, the cable can be disconnected from a catchment mechanism and the removeable reel spool arm 1300 can be removed from the frame 1100, causing the cable to drop to the ground. Each collapsible arm of the pair of collapsible arms 1320,1322 can include a first arm portion 1324 and a second arm portion 1326. The second arm portion 1326 can include a removeable grip 1327. The first arm portion 1324 and the second arm portion 1326 are interconnected and configurable to form a right angle configuration and a lockable configuration.

Figure 1D:
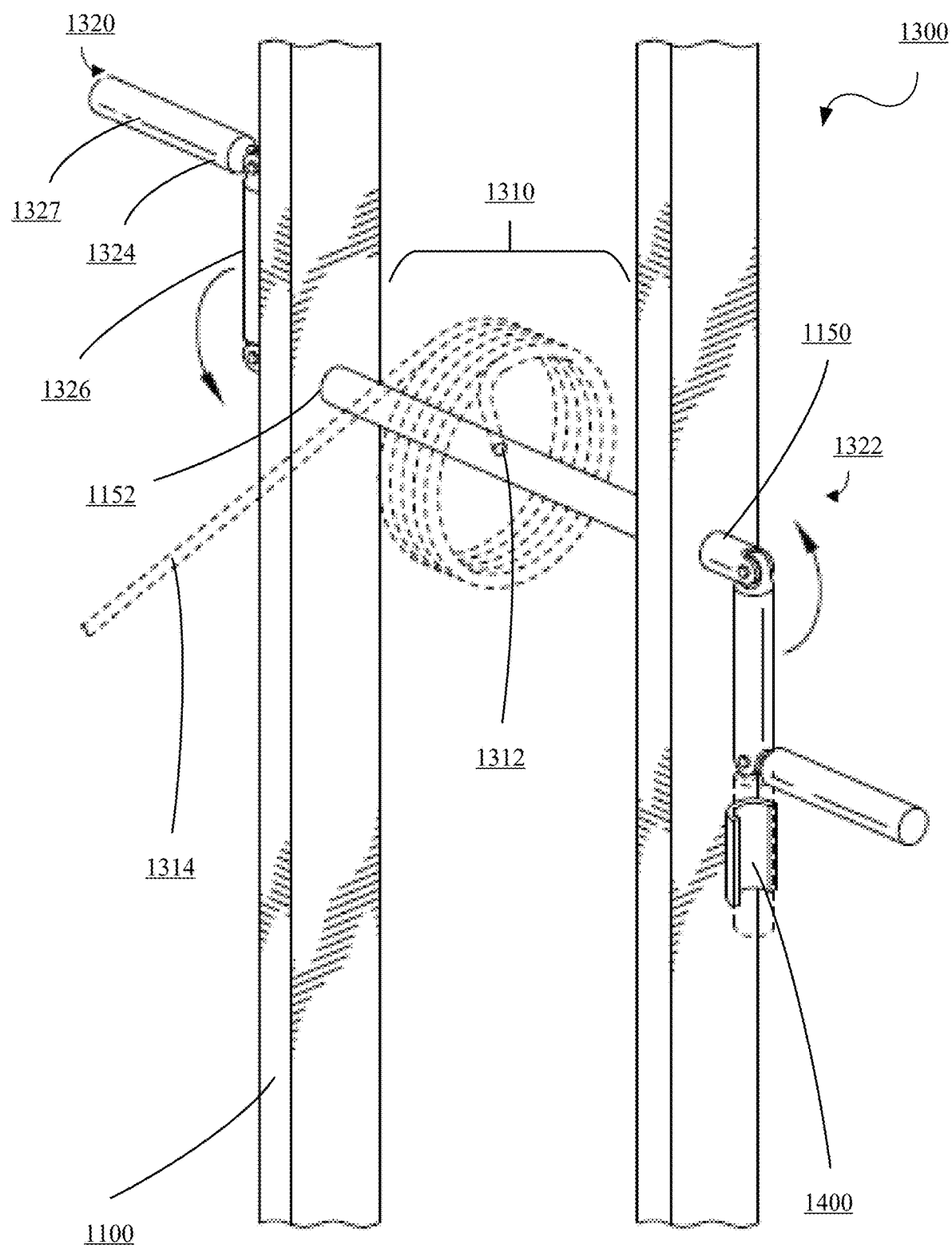
FIG. 1D is an enlarged view of an example removeable reel spool or catchment arm of the cable dolly of FIG. 1A and/or FIG. 1B in accordance with implementations.

The removeable reel spool arm 1300 can be used after placement of the removeable reel spool arm 1300 into spool arm placement holes, as shown in FIG. 1D, in the frame 1100 as more clearly shown and described with respect to FIG. 1D herein below. Once fitted into the frame 1100, the removeable reel spool arm 1300 is kept in place by placing the first arm portion 1324 and the second arm portion 1326 in the lockable configuration. In the lockable configuration, the first arm portion 1324 and the second arm portion 1326 are in a straight or linear position with respect to each other and the pair of reel spool clamps 1400 can be used to secure the removeable reel spool arm 1300. When the service provider personnel needs to use the removeable reel spool arm 1300, the first arm portion 1324 and the second arm portion 1326 are placed in the right angle configuration. The number of removeable reel spools 1300 in a cable dolly 1000 is variable. In some implementations, there can be a removeable reel spool arm 1300 for the guy wire and/or rope and a removeable reel spool arm 1300 for data cable.

The set of wheels 1700 can be used for moving the cable dolly 1000. The set of wheel brakes 1750 are used to lock the set of wheels 1700 when the cable dolly 1000 is in a standing or cable deployment mode.

The removeable tray 1500 can be used for clipping other tools to the cable dolly 1000, can be a bag for holding other tools, and the like. The base 1800 can be used for carrying items in addition to looped cable. The spool meter 1600 can be used to measure a width of looped cable.

FIG. 1B is a side view of the cable dolly 1000 in a standing configuration. As noted, the handle 1200 is adjustable. This can be achieved by removing and replacing a pin 1212 after adjusting a height of the handle 1200. In the standing configuration of FIG. 1B, the cable dolly 1000 shows a kickstand 1900 for stabilizing the cable dolly 1000 when cable is being reeled in or cable is being reeled out. In some implementations, the kickstand 1900 includes a peg 1910 for insertion into the ground. The peg 1910 is retractable in the kickstand 1900 and deployed by disengaging a pin 1912 holding the peg 1910 in the kickstand 1900. When the kickstand 1900 is not use, the kickstand 1900 is latched to the frame 1100 using a kickstand latch 1920 on the frame 1100. In the standing configuration, the wheel brake 1750 is positioned against the wheel 1700 to prevent movement of the cable dolly 1000.

FIG. 1C is another view of the cable dolly 1000 of FIG. 1A. As stated, the cable dolly 1000 can include multiple removeable reel spools. In this view, there is shown the removeable reel spool arm 1300 and a removeable reel spool arm 1330 for carrying a data cable 1340. The removeable reel spool arm 1300 is latched to the frame 1100 using the reel spool arm clamps 1400. The removeable reel spool arm 1330 is latched to the frame 1100 using the reel spool arm clamps 1410. This view of the cable dolly 1000 also shows a cable groove 1930 for routing of underground cable.

FIG. 1D is an enlarged view of the removeable reel spool arm 1300 of the cable dolly 1000 in accordance with implementations. The removeable reel spool arm 1300 is fitted into a pair of reel spool arm placement holes 1150 and 1152 in the frame 1100. The removeable reel spool arm 1300 includes the catchment section 1310 and the pair of collapsible arms 1320,1322 on each end of the catchment section 1310. The catchment section 1310 includes the one or more catchment mechanisms 1312 for attachment of the rope 1314, for example. Each collapsible arm of the pair of collapsible arms 1320,1322 can include the first arm portion 1324 and the second arm portion 1326. The second arm portion 1326 can include the removeable grip 1327. The first arm portion 1324 and the second arm portion 1326 are interconnected and configurable to form a right angle configuration and a lockable configuration. In the lockable configuration, the first arm portion 1324 and the second arm portion 1326 are in a straight or linear position with respect to each other and the pair of reel spool arm clamps 1400 can be used to secure the removeable reel spool arm 1300.

Figure 1E:
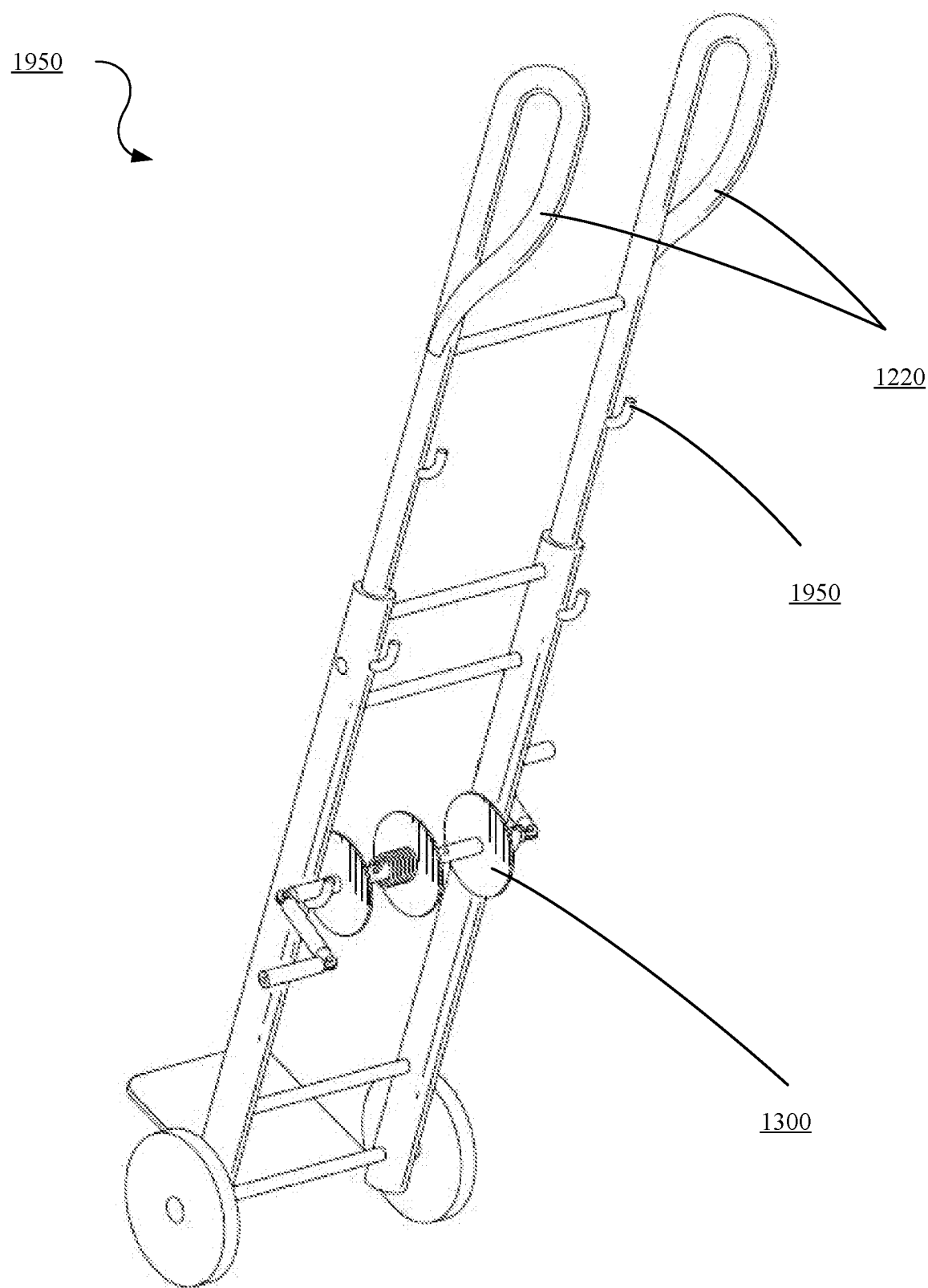
FIG. 1E is a perspective view of an example cable dolly in accordance with implementations.

FIG. 1E is a perspective view of an example cable dolly 1950 in accordance with implementations. The cable dolly 1950 can include the features described herein for the cable dolly 1000. In these implementations, the cable dolly 1950 uses j-type hooks 1960 for placement of one or more removeable reel spools 1300. In addition, the handles 1200 can be a pair of looped handle bars 1220.

Figure 1F:
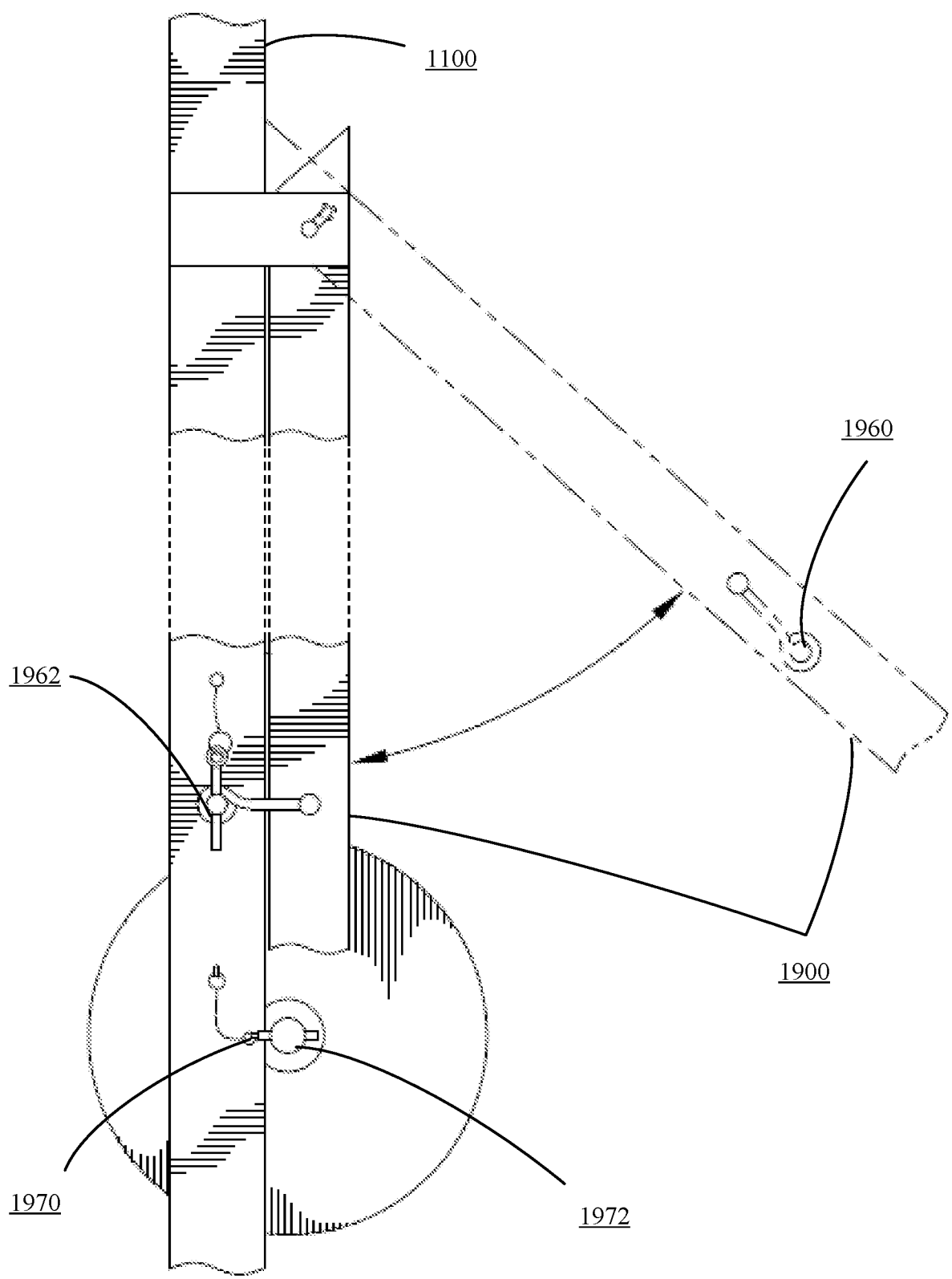
FIG. 1F is an enlarged view of a kickstand for the cable dolly of FIG. 1A and/or FIG. 1E in accordance with implementations.

FIG. 1F is an enlarged view of the kickstand 1900 for the cable dolly 1000 or 1950 of FIG. 1A and/or FIG. 1E, respectively, in accordance with implementations. As shown the kickstand 1900 can in a standing configuration (dashed lines) and a locked configuration. In the locked configuration, the kickstand is latched to the frame 1100 using a hook 1960 latched to an eye 1962 on the frame 1100. FIG. 1F also shows an alternative method for locking the wheel 1700. In these implementations, a hitch pin 1970, which is attached to the frame 1100, can be inserted into a mated opening 1972 on wheel 1700 to lock the wheel 1700.

Figures 2A, 2B:
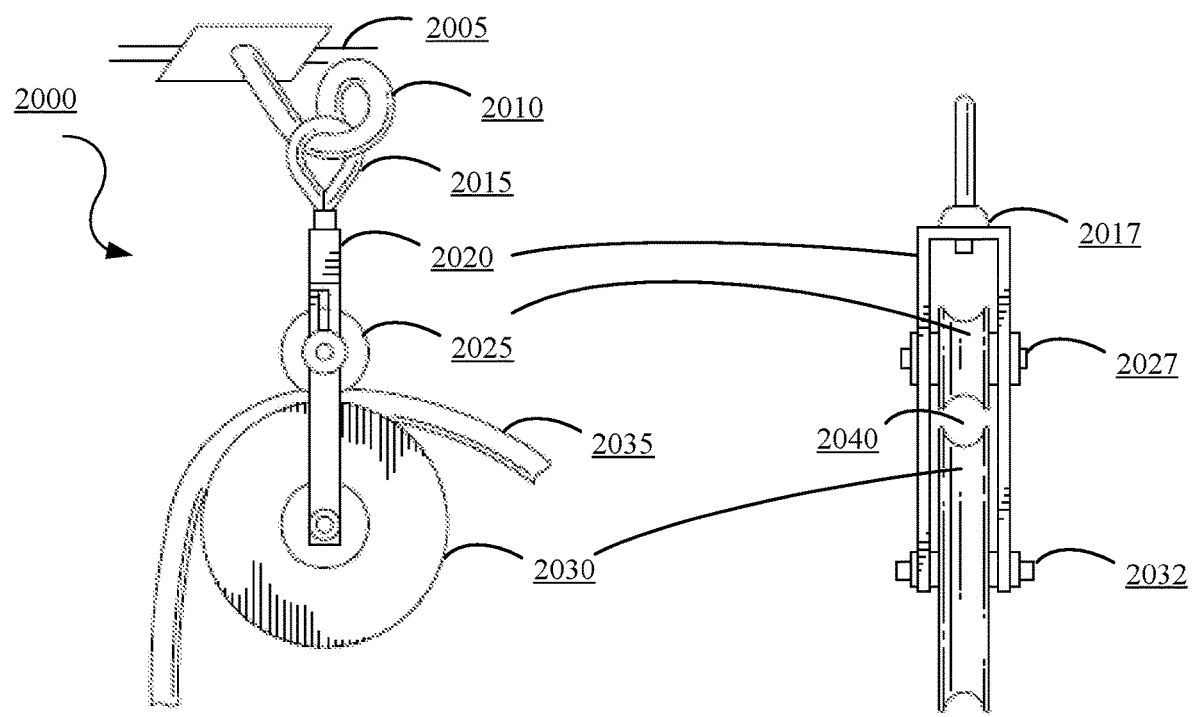
FIG. 2A is a view of an example drop routing pulley in accordance with implementations.
FIG. 2B is a side view of the example drop routing pulley of FIG. 2A in accordance with implementations.

FIG. 2A is a view of an example drop routing pulley 2000 and FIG. 2B is a side view of the drop routing pulley 2000 in accordance with implementations. The drop routing pulley 2000 can be connected to a span wire 2005 as further described in FIG. 6. The drop routing pulley 2000 includes a span clamp 2010, a loop or eye hook 2015, a frame 2020, a guide wheel 2025, and a tension bearing wheel 2030. The loop or eye hook 2015 is connected to the span clamp 2010. The frame 2020 is connected to the loop or eye hook 2015 using a rotatable coupler 2017. The guide wheel 2025 and the tension bearing wheel 2030 are connected to the frame 2020 using rotatable couplers 2027 and 2032, respectively. A data cable 2040 can be routed through an opening 2035 between the guide wheel 2025 and the tension bearing wheel 2030.

Figures 2C, 2D:
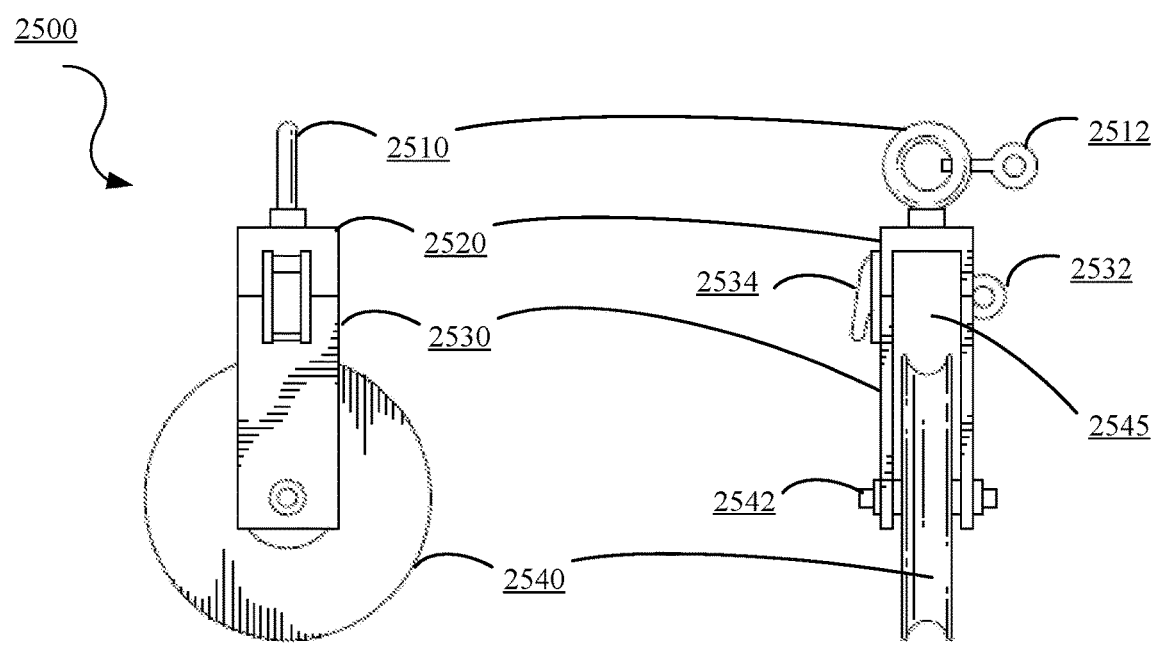
FIG. 2C is a view of another example drop pulley in accordance with implementations.
FIG. 2D is a side view of the drop pulley of FIG. 2C in accordance with implementations.

FIG. 2C is a view of another example drop pulley 2500 and FIG. 2D is a side view of the drop pulley 2500 in accordance with implementations. The drop routing pulley 2500 can be connected to a span wire, a telephone pole, or other structure as further described in FIG. 6. The drop routing pulley 2500 includes a loop or eye hook 2510, a first frame 2520, a second frame 2530, and a routing wheel 2540. The loop or eye hook 2510 includes a hitch pin or clamp mechanism 2512 for connecting to the span wire or the telephone pole, or other structure. The loop or eye hook 2510 is connected to the first frame 2520. The first frame 2520 is connected to the second frame 2530 using a hinge 2532 and clasp 2534 mechanism. The second frame 2530 can be hinged open with respect to the first frame 2520. This permits placement of a data cable in the drop pulley 2500 after the data cable has been attached to a traveler pulley as described herein. The wheel 2540 is connected to the second frame 2530 using a rotatable coupler 2542. A guy wire and/or the data cable can be routed through an opening 2545.

FIG. 3A is an example pulley 3000 and FIG. 3B is a side view of the pulley 3000 in accordance with implementations. The pulley 3000 can be connected to a span wire, a telephone pole, or other structure as further described in FIG. 6. The pulley 3000 includes a pin connecting mechanism 3100 for connecting to the span wire, a telephone pole, or other structure. The pulley 3000 includes a frame 3200, a pin connecting mechanism 3300, and a routing wheel 3400. The pin connecting mechanism 3100 is connected to the frame 3200. The pin connecting mechanism 3300 is connected to the frame 3200. The wheel 3400 is connected to the frame 3200 using a rotatable coupler 3410. A data cable can be routed through an opening 3500.

Figure 4A:
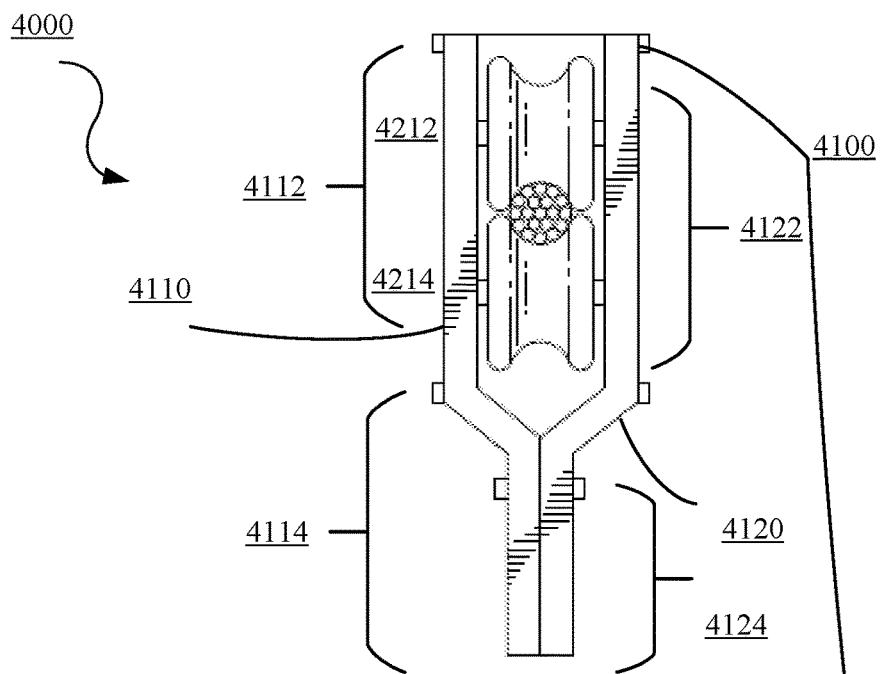
FIG. 4A is a view of an example traveler pulley in accordance with implementations.
Figure 4B:
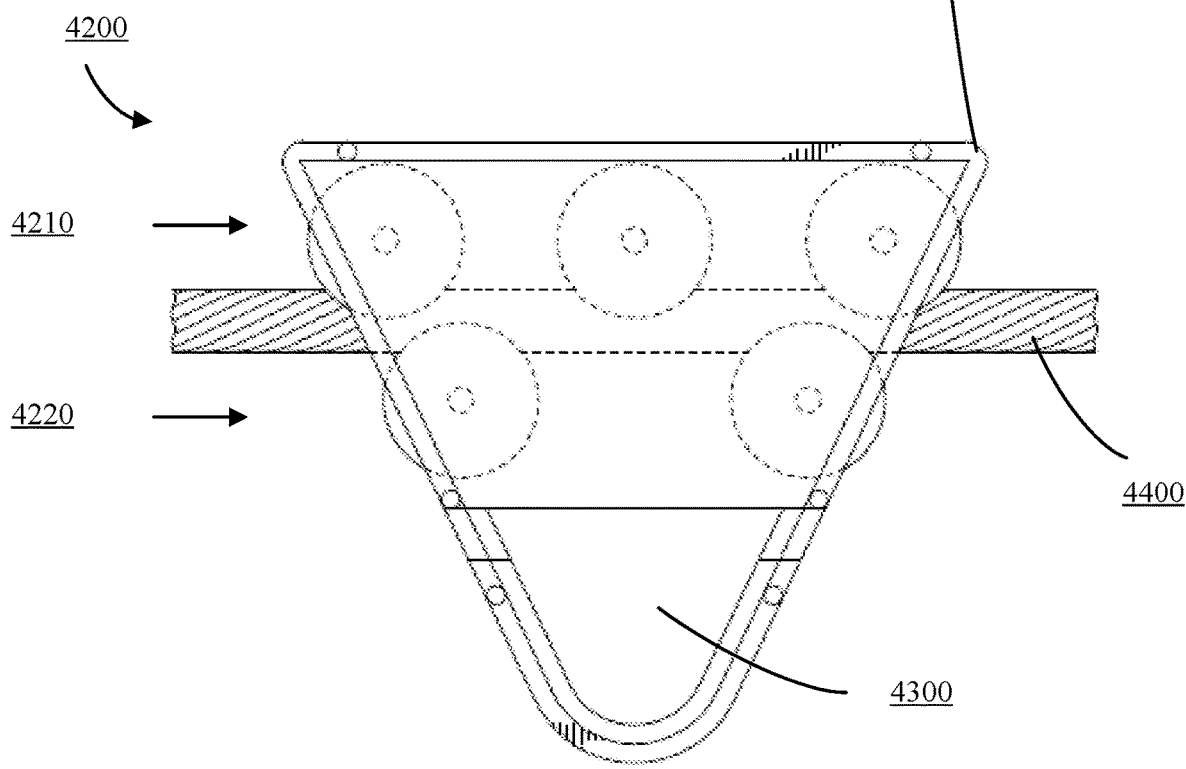
FIG. 4B is a side view of the example traveler pulley of FIG. 4A in accordance with implementations.
Figure 4C:
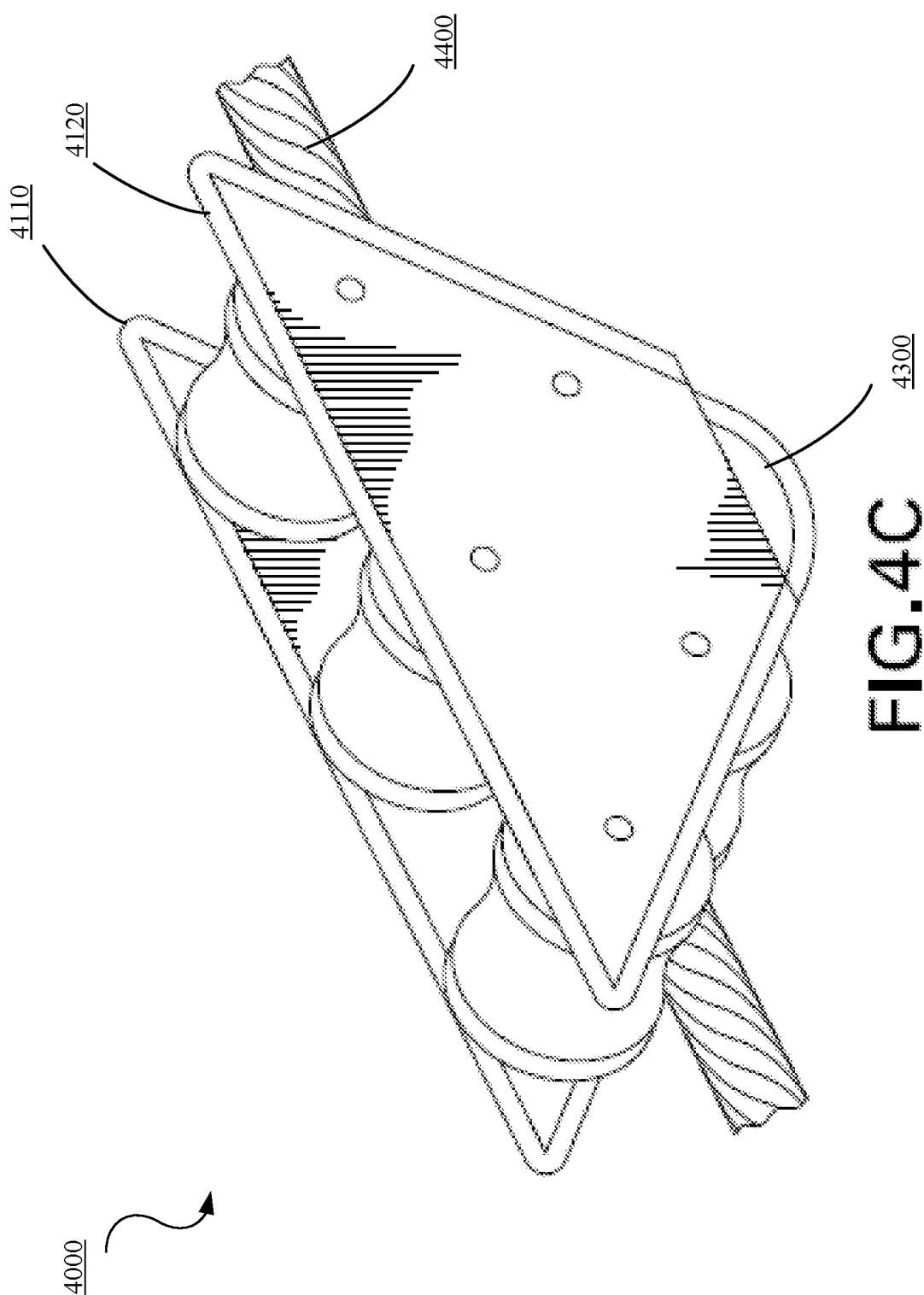
FIG. 4C is a perspective view of the example traveler pulley of FIG. 4A in accordance with implementations.

FIG. 4A is a view of an example traveler pulley 4000, FIG. 4B is a side view of the traveler pulley 4000, and a perspective view of the traveler pulley 4000 in accordance with implementations. The traveler pulley 4000 includes a triangular frame 4100 and a set of routing wheels 4200. The triangular frame 4100 includes a first plate 4110 and a second plate 4120. Each plate has a first section 4112,4122 and a second section 4114,4124.

The set of routing wheels 4200 includes a first set of routing wheels 4210 and a second set of routing wheels 4220. In some implementations, the number of wheels in the first set of routing wheels 4210 is greater than the number of wheels in the second set of routing wheels 4220. The first set of routing wheels 4210 are connected to an upper section 4212 between the first section 4112 of the first plate 4110 and the first section 4122 of the second plate 4120 via couplers or rotational couplers and the second set of routing wheels 4220 are connected to a lower section 4214 between the first section 4112 of the first plate 4110 and the first section 4122 of the second plate 4120 via couplers or rotational couplers. The second section 4114 of the first plate 4110 and the second section 4124 of the second plate 4120 are connected together to form a triangular opening 4300.

The traveler pulley 4000 travels on a guy wire 4400, which is positioned in an opening between the first set of routing wheels 4210 and the second set of routing wheels 4220. A data cable and a rope are connected to the triangular opening 4300 as further described in FIG. 6. The traveler pulley 4000 pulls the data cable along the guy wire 4400 as the rope is pulled by a user.

Figure 5:
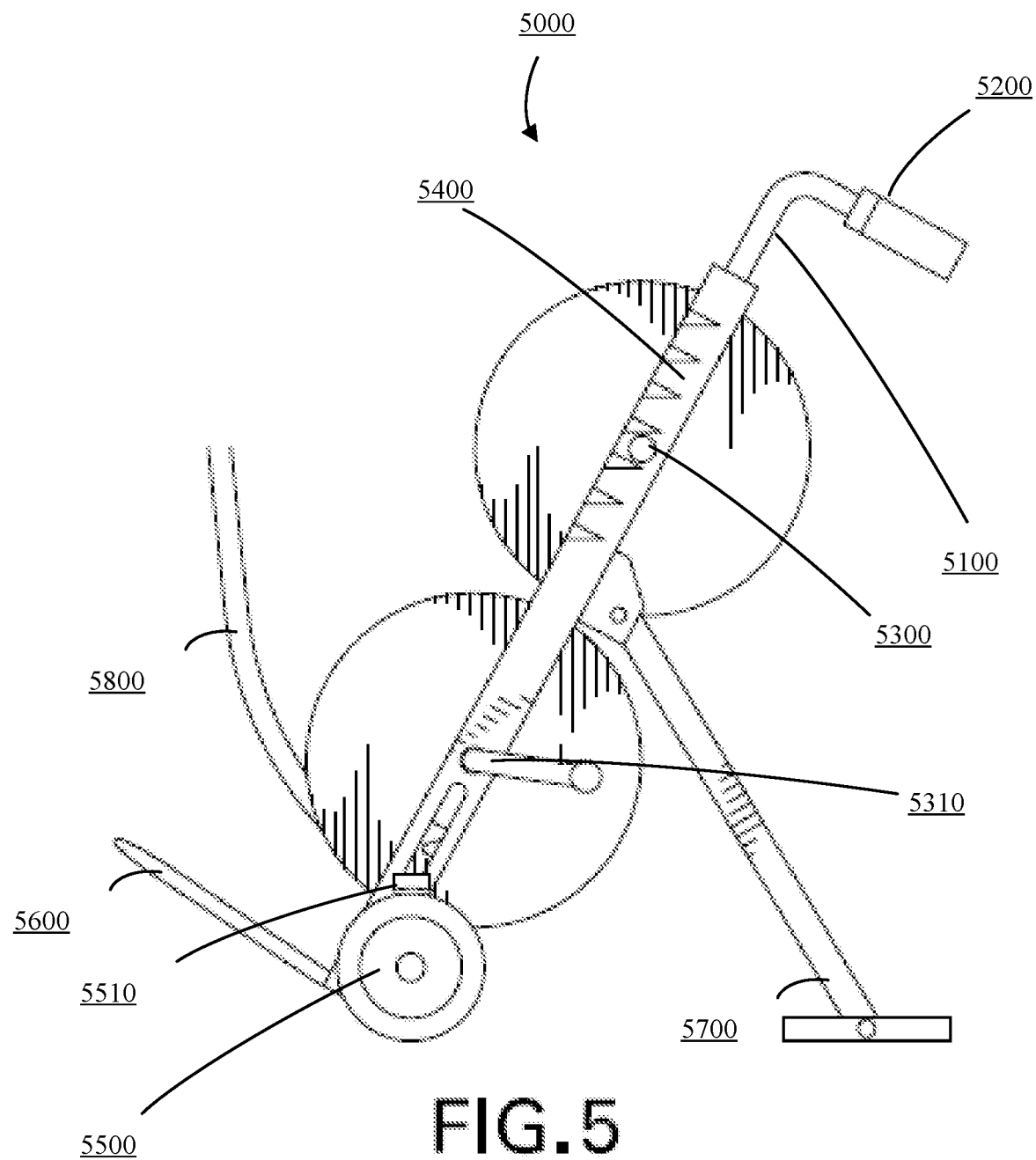
FIG. 5 is a view of an example cable dolly in a cable deployment configuration in accordance with implementations.

FIG. 5 is a side view of an example cable dolly 5000 in a cable deployment configuration in accordance with implementations. The cable dolly 5000 can include the features described herein for the cable dolly 1000 and the cable dolly 1950. The cable dolly 5000 includes a frame 5100, handles 5200, removeable reel spools 5300,5310, a spool meter 5400, a set of wheels 5500, a set of wheel brakes 5510, a base or lift plate 5600, and a kickstand 5700. The frame 5100, the handles 5200, the removeable reel spools 5300, 5310, the spool meter 5400, the set of wheels 5500, the set of wheel brakes 5510, the base or lift plate 5600, and the kickstand 5700 are connected and operable as described herein.

Figure 6:
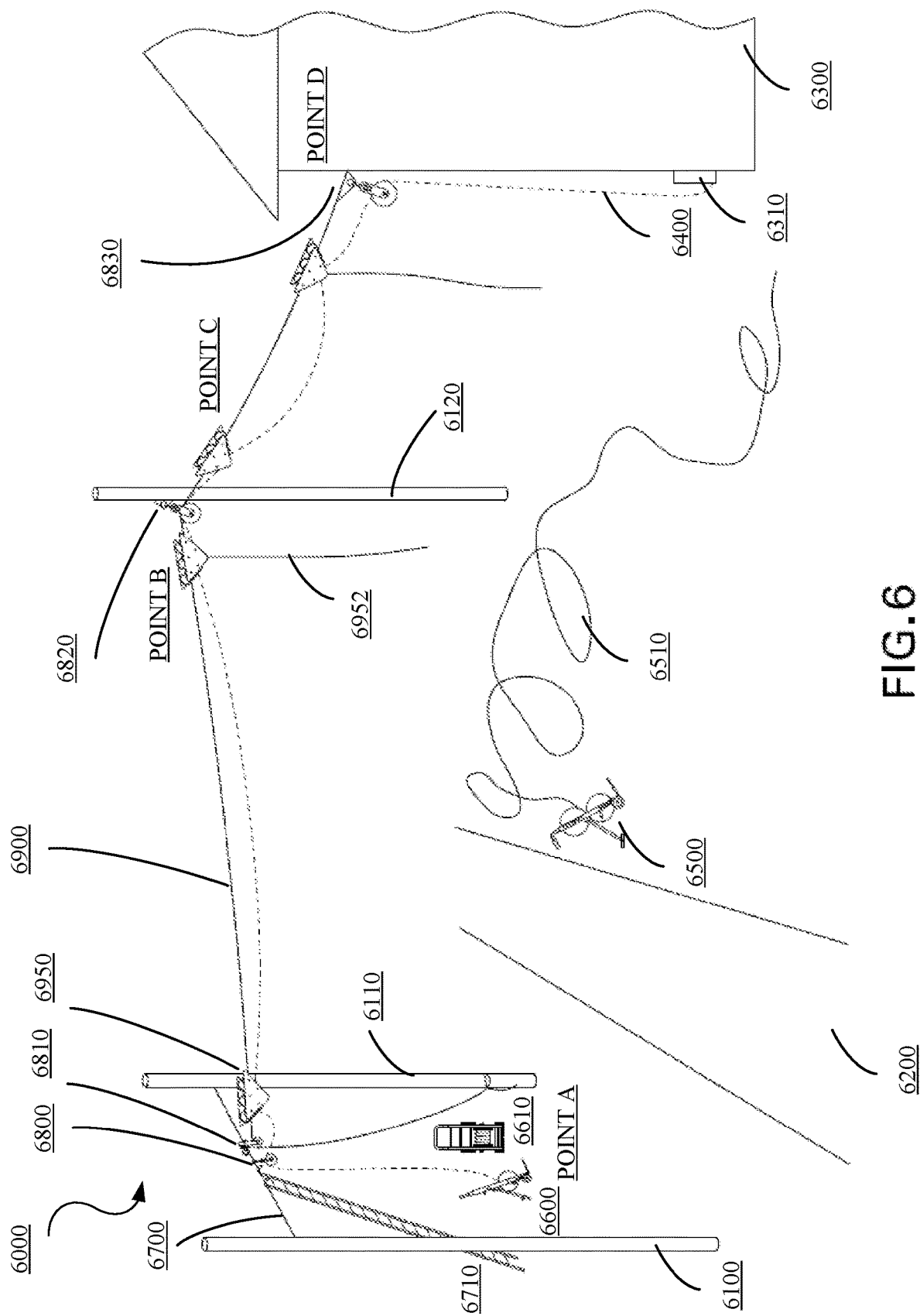
FIG. 6 is a view of an example cable deployment in accordance with implementations.

FIG. 6 is a view of an example cable deployment scenario 6000 in accordance with implementations. The cable deployment scenario 6000 includes poles 6100, 6110, and 6120, a road 6200, and a premise 6300. In the cable deployment scenario 6000, a data cable 6400 is being laid from a point A to a demarcation point 6310 on the premise 6300. In some implementations, this could be a new cable deployment or a replacement cable deployment. In the instance of a replacement cable deployment, a cable dolly 6500 can be used to reel in damaged cable 6510 as described herein. The cable dolly 6500 can be the cable dolly 1000, 1950, 5000, and/or combinations thereof in a standing configuration as described herein.

Cable dollies 6600 and 6610 are positioned in a standing configuration at point A, each cable dolly 6600 and 6610 having a spool of data cable, such as the data cable 6400, ready for deployment. The cable dollies 6600 and 6610 can be the cable dolly 1000, 1950, 5000, and/or combinations thereof in a standing configuration as described herein. In the cable deployment scenario 6000, a span wire 6700 is already connected between the poles 6100 and 6110. A ladder 6710 can be used to attach a clamp 6800 and one or more pulleys 6810, 6820, and 6830, such as the drop routing pulley 2000, the drop pulley 2500, the pulley 3000, and/or combinations thereof on the span wire 6700, the pole 6120, and the premise 6300.

A guy wire 6900 can be attached to the clamp 6800, pulled across the road 6200 and attached to the pulley 6820 and the pulley 6830. The guy wire 6900 is lighter as compared to the data cable 6400 and can be more easily and safely pulled across the road 6200. The guy wire 6900 can be tensioned by tying one end to the pole 6110. In some implementations, another cable can be used to tension the guy wire 6900 using the pole 6120. A traveler pulley 6950 can be positioned on the guy wire 6900. In some implementations, multiple traveler pulleys 6950 can be used. A rope 6952 is attached to the traveler pulley 6950 to pull the traveler pully 6950 across the guy wire 6900. The data cable 6400 is attached to the traveler pulley 6950. In some implementations, a messenger of the data cable 6400 is attached to the traveler pulley 6950. The traveler pulley 6950 is pulled across the road 6200 from point A to point B. At point B, the pulley 6820, which is a drop pulley 2500, is opened and the guy wire 6900 is removed to allow the traveler pulley 6950 move from point B to point C. The data cable 6400 is inserted into the pulley 6820 at this time. In some implementations, the guy wire 6900 can be reinserted into the pulley 6820. In some implementations, the guy wire 6900 can be attached to the pulley 6820 using a p-type or j-type hook or the guy wire 6900 can be attached to the pole 6120 using another attachment mechanism as is well-known. The traveler pulley 6960 is then pulled from point C to point D to complete deploying the data cable 6400 to the demarcation point 6310. The data cable 6400 is fed from the cable dolly 6600.

Using the cable dollies and pulleys as described herein transfers the load from the service provider personnel to the cable dollies, pulleys, and guy wire. In addition, pulling the data cable 6400 over the road 6200 becomes less hazardous. Laying of data cable can be done by attached the data cable to a pedestal or pole at one end and then pulling the cable dolly to a destination. The data cable reels out as needed.

In general, a cable dolly includes a frame including a pair of reel spool arm placement holes, a handle attached to a top part of the frame, a reel spool arm removeably positioned in the pair of reel spool arm placement holes, a pair of reel spool arm clamps attached to the frame, the pair of reel spool arm clamps configured to clamp the reel spool arm to the frame, a pair of wheels attached to the frame, and a base attached to the frame.

In some implementations, the reel spool arm further includes a catchment section and a pair of collapsible arms attached to each end of the catchment section, wherein each of the pair of reel spool arm clamps is configured to clamp one of the pair of collapsible arms. In some implementations, the catchment section further includes one or more catchment mechanisms for attaching a cable. In some implementations, each of the pair of collapsible arms further includes a first arm portion and a second arm portion moveably connected to the first arm portion, where the first arm portion and the second arm portion having a right angle configuration configured to reel in cable and having a lockable configuration configured to be clamped by one of the pair of reel spool arm clamps. In some implementations, the cable dolly further includes a kickstand moveably attached to the frame, the kickstand configured to enable placement of the cable dolly in a standing configuration for deployment of cable from the cable dolly. In some implementations, the kickstand further includes a retractable peg in the kickstand configured to penetrate a ground and enable enhanced placement of the cable dolly in the standing configuration for deployment of the cable from the cable dolly. In some implementations, the frame further includes a latching mechanism configured to latch to a mating latching mechanism on the kickstand when the cable dolly is in a non-standing configuration. In some implementations, the cable dolly further includes a pair of wheel brakes configured to stop movement of the pair of wheels when the cable dolly is in the standing configuration. In some implementations, the cable dolly further includes a spool meter on the frame, the spool meter configured to indicate a length of cable present on the cable dolly. In some implementations, the frame further includes one or more handle clips configured to enable adjusting a height of the handle, the one or more handle clips configured to fit one or more holes in the handle.

In general, a telecommunications apparatus includes a cable dolly, a plurality of pulleys, and a traveler pulley. The cable dolly includes a first removeable reel spool arm configured to hold a guy wire spool and a rope spool and a second removeable reel spool arm configured to hold a data cable spool. The traveler pulley is configured be attached to a rope from the rope spool and a data cable from the data cable spool. The one or more of the plurality of pulleys are attached to at least one of a span wire spanning two poles, a pole, or a premises. A guy wire from the guy wire spool is connected to the attached pulleys. The traveler pulley is deployed on the guy wire and configured to be moved by the rope across the guy wire. The data cable is laid out from the second removeable reel spool arm to the premises by moving the traveler pulley.

In some implementations, each of the first removeable reel spool arm and the second removeable reel spool arm further includes a catchment section and a pair of collapsible arms attached to each end of the catchment section, wherein each reel spool arm clamp of a pair of reel spool arm clamps is configured to clamp one of the pair of collapsible arms. In some implementations, the catchment section further includes one or more catchment mechanisms for attaching to a cable. In some implementations, each of the pair of collapsible arms further includes a first arm portion and a second arm portion moveably connected to the first arm portion, where the first arm portion and the second arm portion having a right angle configuration configured to reel in cable and having a lockable configuration configured to be clamped by one of the pair of reel spool arm clamps. In some implementations, the cable dolly further includes a kickstand configured to enable placement of the cable dolly in a standing configuration for deployment of the data cable from the cable dolly. In some implementations, the kickstand further includes a retractable peg in the kickstand configured to penetrate a ground and enable enhanced placement of the cable dolly in the standing configuration for deployment of the data cable from the cable dolly. In some implementations, the cable dolly further includes a latching mechanism configured to latch to a mating latching mechanism on the kickstand when the cable dolly is in a non-standing configuration. In some implementations, the cable dolly further includes a pair of wheel brakes configured to stop movement of a pair of wheels when the cable dolly is in the standing configuration. In some implementations, the cable dolly further includes a spool meter on the frame, the spool meter configured to indicate a length of cable present on the cable dolly. In some implementations, the cable dolly further includes one or more handle clips configured to enable adjusting a height of a handle, the one or more handle clips configured to fit one or more holes in the handle.

The construction and arrangement of the methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

Although the figures may show a specific order of method steps, the order of the steps may differ from what is depicted. Also, two or more steps may be performed concurrently or with partial concurrence. Such variation will depend on the hardware systems chosen and on designer choice. All such variations are within the scope of the disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A cable dolly comprising:
   a frame including a pair of reel spool arm placement holes;
   a handle attached to a top part of the frame;
   a reel spool arm removeably positioned in the pair of reel spool arm placement holes;

a catchment section in the reel spool arm;

a pair of reel spool arm clamps attached to the frame, the pair of reel spool arm clamps configured to clamp the reel spool arm to the frame;

a pair of collapsible arms attached to each end of the catchment section, wherein each of the pair of reel spool arm clamps is configured to clamp one of the pair of collapsible arms;

a pair of wheels attached to the frame; and a base attached to the frame.

2. The cable dolly of claim 1, the catchment section further comprising:

one or more catchment mechanisms for attaching a cable.

3. The cable dolly of claim 2, each of the pair of collapsible arms further comprising:

a first arm portion; and a second arm portion moveably connected to the first arm portion, wherein the first arm portion and the second arm portion having a right angle configuration configured to reel in cable and having a lockable configuration configured to be clamped by one of the pair of reel spool arm clamps.

4. The cable dolly of claim 3, further comprising:

a kickstand moveably attached to the frame, the kickstand configured to enable placement of the cable dolly in a standing configuration for deployment of cable from the cable dolly.

5. The cable dolly of claim 4, the kickstand further comprising:

a retractable peg in the kickstand configured to penetrate a ground and enable enhanced placement of the cable dolly in the standing configuration for deployment of the cable from the cable dolly.

6. The cable dolly of claim 5, the frame further comprising:

a latching mechanism configured to latch to a mating latching mechanism on the kickstand when the cable dolly is in a non-standing configuration.

7. The cable dolly of claim 5, further comprising:

a pair of wheel brakes configured to stop movement of the pair of wheels when the cable dolly is in the standing configuration.

8. The cable dolly of claim 1, further comprising:

a spool meter on the frame, the spool meter configured to indicate a length of cable present on the cable dolly.

9. The cable dolly of claim 1, the frame further comprising:

one or more handle clips configured to enable adjusting a height of the handle, the one or more handle clips configured to fit one or more holes in the handle.

10. A cable dolly comprising:

a frame including a pair of reel spool arm placement holes;

a reel spool arm removeably positioned in the pair of reel spool arm placement holes;

a catchment section in the reel spool arm;

a pair of reel spool arm clamps attached to the frame, the pair of reel spool arm clamps configured to clamp the reel spool arm to the frame;

a pair of collapsible arms attached to each end of the catchment section, wherein each of the pair of reel spool arm clamps is configured to clamp one of the pair of collapsible arms; and a pair of wheels attached to the frame.

11. The cable dolly of claim 10, the catchment section further comprising:

one or more catchment mechanisms for attaching a cable.

12. The cable dolly of claim 10, each of the pair of collapsible arms further comprising:

a first arm portion; and a second arm portion moveably connected to the first arm portion, wherein the first arm portion and the second arm portion having a right angle configuration configured to reel in cable and having a lockable configuration configured to be clamped by one of the pair of reel spool arm clamps.

13. The cable dolly of claim 10, further comprising:

a kickstand moveably attached to the frame, the kickstand configured to enable placement of the cable dolly in a standing configuration for deployment of cable from the cable dolly.

14. The cable dolly of claim 13, the kickstand further comprising:

a retractable peg in the kickstand configured to penetrate a ground and enable enhanced placement of the cable dolly in the standing configuration for deployment of the cable from the cable dolly.

15. The cable dolly of claim 13, the frame further comprising:

a latching mechanism configured to latch to a mating latching mechanism on the kickstand when the cable dolly is in a non-standing configuration.

16. The cable dolly of claim 13, further comprising:

a pair of wheel brakes configured to stop movement of the pair of wheels when the cable dolly is in the standing configuration.

17. The cable dolly of claim 10, further comprising:

a spool meter on the frame, the spool meter configured to indicate a length of cable present on the cable dolly.

18. The cable dolly of claim 10, the frame further comprising:

one or more handle clips configured to enable adjusting a height of a handle connected to the frame, the one or more handle clips configured to fit one or more holes in the handle.

* * * * *